(12) United States Patent
Yasuhara

(10) Patent No.: US 7,190,798 B2
(45) Date of Patent: Mar. 13, 2007

(54) ENTERTAINMENT SYSTEM FOR A VEHICLE

(75) Inventor: Toshiyuki Yasuhara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 229 days.

(21) Appl. No.: 10/243,591

(22) Filed: Sep. 13, 2002

(65) Prior Publication Data

US 2003/0053638 A1   Mar. 20, 2003

(30) Foreign Application Priority Data

Sep. 18, 2001   (JP)   .............................. 2001-284077

(51) Int. Cl.
  *H04B 1/00* (2006.01)
  *H02B 1/00* (2006.01)
  *G06F 7/00* (2006.01)
(52) U.S. Cl. ........................... 381/86; 381/123; 701/36
(58) Field of Classification Search ................. 381/86, 381/302, 123, 307; 701/36; 307/10.1
See application file for complete search history.

(56) References Cited

U.S. PATENT DOCUMENTS

| 5,108,335 | A | * | 4/1992 | Carey et al. ................. 455/345 |
| 5,420,931 | A | * | 5/1995 | Donner et al. ................. 381/86 |
| 5,661,811 | A | * | 8/1997 | Huemann et al. ............. 381/25 |
| 6,014,381 | A | * | 1/2000 | Troxel et al. .......... 370/395.52 |
| 6,148,253 | A | | 11/2000 | Taguchi et al. |
| 6,330,337 | B1 | * | 12/2001 | Nicholson et al. ............ 381/86 |
| 6,407,733 | B1 | | 6/2002 | Kawakami |
| 6,694,236 | B2 | | 2/2004 | Onodera |
| 2003/0012389 | A1 | | 1/2003 | Brice et al. |
| 2003/0053638 | A1 | | 3/2003 | Yasuhara |
| 2003/0215102 | A1 | | 11/2003 | Marlowe |

FOREIGN PATENT DOCUMENTS

| JP | 5-68300 | 3/1993 |
| JP | 08-028121 A | 1/1996 |
| JP | 10-140899 A | 5/1998 |
| JP | 11-041691 | 2/1999 |
| JP | 11-170922 | 6/1999 |
| JP | 3062228 U | 6/1999 |
| JP | 2001-114027 | 4/2001 |

* cited by examiner

*Primary Examiner*—Xu Mei
(74) *Attorney, Agent, or Firm*—Pearne & Gordon LLP

(57) ABSTRACT

An entertainment system mounted on a vehicle comprises a plurality of audio sources. The entertainment system further comprises a head unit provided in the front seat area and a rear controller provided in the rear seat area. The head unit includes a control switch for switching between front control and rear control. The front control selects a front audio source to be played in the front seat area and controls the selected front audio source. The rear control selects a rear audio source to be played in the rear seat area and controls the selected rear audio source. Thus, a front user can operate the rear audio source. The head unit further includes an enabling switch for switching between an enabled state in which operation of the rear controller is enabled and a disabled state in which operation of the rear controller is disabled. Thus, audio operation by a rear user can be restricted. The entertainment system switches between connection and disconnection of the rear speakers according to whether the front audio source is the same as the rear audio source.

22 Claims, 13 Drawing Sheets

(a)

(b)

ENTERTAINMENT SYSTEM FOR A VEHICLE

TECHNICAL FIELD

The invention relates to an entertainment system mounted on a vehicle for providing occupants with audio and/or video programs played by a device such as a CD player, DVD player, AM/FM tuner or cassette player. More specifically, the invention relates to an entertainment system in which a driver or front passenger can control a rear audio source that provides audio and/or video for rear seat occupants.

BACKGROUND OF THE INVENTION

A system comprising audio devices such as a CD player, cassette player, and AM/FM tuner for providing audio services and audio-visual devices such as a TV tuner and DVD player for providing audio and video services is becoming popular for use with a vehicle. Occupants in the vehicle can enjoy audio and/or video programs from various types of audio sources. Conventionally, such an entertainment system is controlled by a head unit that is typically mounted on a dashboard in the front seat area. A desired audio source is selected by buttons provided on the head unit. Occupants in the vehicle enjoy audio and/or video programs from the selected audio source.

Recently, a rear entertainment system comprising a rear control unit provided in the rear seat area is proposed. Rear seat occupants can select an audio source by operating the rear control unit to enjoy audio and/or video programs from the selected audio source. According to the rear entertainment system, the rear seat occupants can select a rear audio source that is different from a front audio source selected on the head unit by the driver or front passenger.

Japanese Patent Application Unexamined Publication (Kokai) No. 2001-114027 discloses an audiovisual reproducing device mounted on a vehicle. The audiovisual reproducing device comprises a main control unit provided in the front seat area and a rear control unit provided in the rear seat area. The rear control unit includes a holder to which a plug of a headphone is inserted, buttons for selecting a rear audio source, buttons for operating the selected rear audio source, a volume button, and a display for showing the kind of the selected rear audio source. Rear seat occupants turn on the rear control unit by inserting the plug of the headphone into the holder. The rear seat occupants can select a rear audio source that is different from a front audio source selected by the driver or front passenger to enjoy audio and/or video programs from the rear audio source using the headphone.

U.S. Pat. No. 5,661,811 discloses an audio system mounted on a vehicle. The audio system comprises a front control unit provided in the front seat area and a rear control unit provided in the rear seat area. The rear control unit comprises a power switch, buttons for selecting a rear audio source, and buttons for operating the selected rear audio source. When the audio system is turned on, only the front control unit is available. The rear control unit remains in an "off" state. If the rear control unit is turned on by the power switch, headphones are enabled and rear speakers are disconnected. A rear user can select a rear audio source different from a front audio source selected by a front user to enjoy audio programs from the rear audio source using the headphone.

The rear entertainment system as described above is useful for a rear user to select a rear audio source that is different from a front audio source selected by a front user. However, it may be difficult for some rear users to operate a rear control unit provided in the rear seat area. For example, when a small child sits in the rear seat, it may be difficult to select a desired audio source and change a channel by operating the rear control unit. Pressing an operating button just for fun may lead to misoperation of the rear control unit.

Moreover, when a user who is unfamiliar with operating an audio system mounted on a vehicle is in the rear seat, operating a rear control unit may be difficult. Since the rear control unit is provided in the rear seat area, it is difficult for a front user to stretch out his/her arm and operate the rear control unit for the rear user.

Therefore, there exists a need for an entertainment system mounted on a vehicle in which a front user can easily control a rear audio source for a rear user.

SUMMARY OF THE INVENTION

According to one aspect of the invention, an entertainment system mounted on a vehicle is provided. The entertainment system comprises a plurality of audio sources and a head unit that is provided in the front seat area. The head unit includes a control switch for switching between front control and rear control. In the front control, a front audio source to be played in the front seat area is selected from the plurality of audio sources and the selected front audio source is controlled by the head unit. In the rear control, a rear audio source to be played in the rear seat area is selected from the plurality of audio sources and the selected rear audio source is controlled by the head unit. Since the rear control can be selected by the head unit, a front user can easily operate the rear audio source. This is especially useful when a small child or a user who is unfamiliar with operating the entertainment system is seated in the rear seat.

According to one embodiment of the invention, the head unit comprises an audio source control button. When the front control is selected by the control switch, the audio source control button allows the front audio source to be selected and controlled. When the rear control is selected by the control switch, the audio source control button allows the rear audio source to be selected and controlled. Since the head unit is capable of selecting and controlling the rear audio source, the front user can assist a rear user in operating the rear audio source.

According to one embodiment of the invention, if the head unit is not operated for a predetermined period after the rear control is selected by the control switch, the rear control is switched to the front control. According to one embodiment of the invention, when the entertainment system is turned on, the front control is selected. Since the control mode of the entertainment system defaults to the front control mode, ease of operation for a front user is improved.

According to one embodiment of the invention, the head unit includes an indicator indicating which of the front control or the rear control is currently selected. A user can visually realize the current control mode by the indicator.

According to another aspect of the invention, the entertainment system comprises a rear controller provided in the rear seat area. The rear controller selects a rear audio source to be played in the rear seat area from the plurality of audio sources and controls the selected rear audio source. The head unit includes an enabling switch for switching between an enabled state and a disabled state. The enabled state is a state in which operation of the rear controller is enabled. The disabled state is a state in which operation of the rear controller is disabled. Thus, a front user can prevent a rear user from operating the rear audio source. Especially, when a small child is in the rear seat, a front user can place the rear controller in the disabled state to prevent the child from operating the rear audio source. The enabling switch may be integrated with the control switch.

According to one embodiment of the invention, a rear control switch is provided between the head unit and the rear controller. If the enabled state is selected by the enabling switch, the head unit turns on the rear control switch to connect the head unit to the rear controller. If the disabled state is selected by the enabling switch, the head unit turns off the rear control switch to disconnect the head unit from the rear controller.

According to another embodiment of the invention, if the disabled state is selected by the enabling switch, the head unit disables a signal issued by the rear controller.

According to another aspect of the invention, the head unit includes a rear power switch for turning on the rear controller. The rear controller selects a rear audio source to be played in the rear seat area from a plurality of audio sources and controls the selected rear audio source. If the entertainment system is turned off by a main power switch provided on the head unit, the rear controller is also turned off. When a user wants to hear sound outside of the vehicle or in case of an emergency, the user can stop all the functions of the entertainment system by simply pressing the main power switch.

According to one embodiment of the invention, the head unit comprises a twin display. The twin display includes a front display part for showing an operating state of the front audio source and a rear display part for showing an operating state of the rear audio source. If the disabled state in which operation of the rear controller is disabled is selected, an indication showing the disabled state is displayed in the rear display part.

According to another aspect of the invention, the entertainment system mounted on a vehicle comprises a plurality of audio sources, at least one front speaker provided in the front seat area, at least one rear speaker and a headphone provided in the rear seat area, a head unit for selecting a front audio source from the plurality of audio sources, and a rear controller for selecting a rear audio source from the plurality of audio sources. The selected front audio source is connected to the front and rear speakers. The selected rear audio source is connected to the headphone. If the selected rear audio source is the same as the selected front audio source when the rear controller is on, the rear speaker is connected to the front audio source so that sound comes out of the front and rear speakers. If the selected rear audio source is different from the selected front audio source when the rear controller is on, the rear speaker is disconnected from the front audio source so that sound does not come out of the rear speaker. Thus, when the front and rear audio sources are the same, a more realistic sound is achieved by the front and rear speakers. When the front and rear audio sources are different, the speakers are automatically switched to prevent interference between sound from the front speaker and sound from the rear speaker. When the rear speaker is disconnected from the front audio source, an indication showing the disconnection is displayed in the rear display part of the head unit.

According to one embodiment, switching of the speakers is performed by switching a speaker switch between on and off. The speaker switch is provided between the rear speaker and the front audio source.

DESCRIPTION OF THE PREFERRED EMBODIMENTS

Preferred embodiments of the present invention will be described referring to attached drawings.

System Overview

Figure 1:
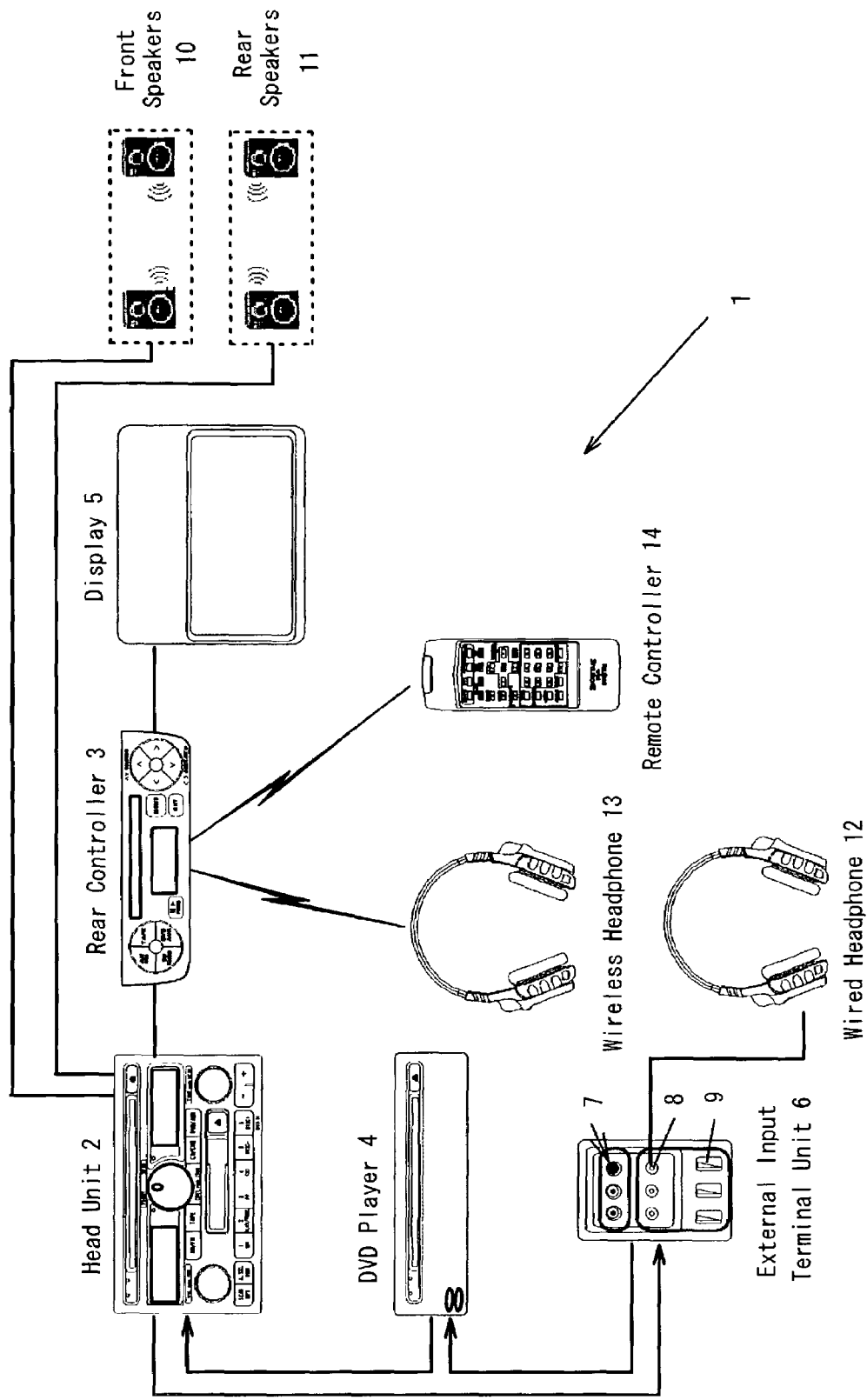
FIG. 1 is a schematic diagram showing a configuration of an entertainment system according to one embodiment of the invention.

FIG. 1 shows components included in an entertainment system mounted on a vehicle, according to one embodiment of the invention. The entertainment system 1 comprises a head unit 2 and a rear controller 3. The head unit 2 is mounted on a dashboard in the front seat area of the vehicle so that a front user (e.g., a driver or front passenger) operates the head unit 2 (see FIG. 2(a)). Speakers 10 are provided in the front seat area, which are hereinafter referred to as front speakers. Speakers 11 are provided in the rear seat area of the vehicle, which is hereinafter referred to as rear speakers. A front user can operate the head unit 2 to select an audio source to be connected to the speakers 10 and 11 (hereinafter, referred to as a front audio source) and control the selected front audio source. Headphones 12 and 13 are provided in the rear seat area. A front user can operate the head unit 2 to select an audio source to be connected to the headphones 12 and 13 (hereinafter, referred to as a rear audio source) and control the selected rear audio source. An AM/FM tuner, cassette tape player, and CD player (not shown) are mounted on the head unit 2.

Figure 2:
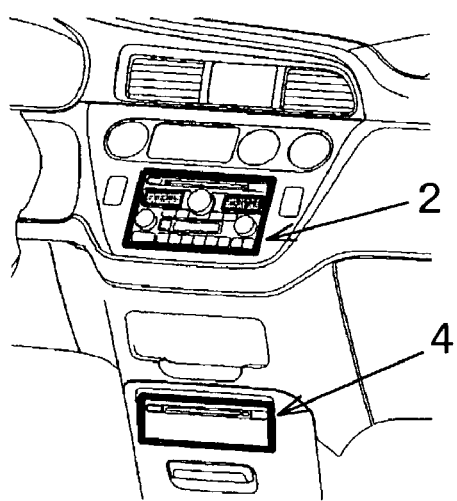
FIG. 2 is an example of placement of a head unit, a rear controller and a DVD player according to one embodiment of the invention.
Figure 2:
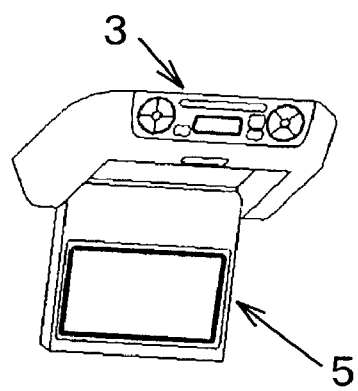

As shown in FIG. 2(b), the rear controller 3 is mounted on the ceiling of the vehicle so that a rear user can operate it. Alternatively, the rear controller may be provided in another location such as a center armrest provided in the rear seat.

A user in the rear seat operates the rear controller 3 to select the rear audio source and control the selected rear audio source. A rear user can use a remote controller 14 to operate the rear controller 3. Thus, the entertainment system 1 according to the invention is configured so that not only the rear controller 3 but also the head unit 2 can select the rear audio source and control the selected rear audio source.

In the embodiment, two front speakers 10 are provided, one front left, the other front right. Similarly, two rear speakers 11 are provided, one rear left, the other rear right. The headphone 12 is a wired headphone. The wired headphone 12 is connected to a headphone terminal 8 provided on an external input terminal unit 6. A volume button 9 for adjusting the volume of the wired headphone 12 is also provided on the external input terminal unit 6. A rear user can adjust the volume of the headphone 12 by operating the volume button 9.

The headphone 13 is a wireless headphone including an infrared receiver. The wireless headphone 13 performs infrared communications with the rear controller 3 through the infrared receiver. A volume button is provided outside the headphone earcup. The volume of the wireless headphone 13 can be adjusted by the volume button. In this embodiment, a rear user uses the wired headphone 12 or the wireless headphone 13 to listen to sound from the rear audio source.

When the rear audio source for entertaining a rear user is different from the front audio source, interference between sound from the rear audio source and sound from the front audio source occurs. In order to prevent the interference, the wired headphone 12 and the wireless headphone 13 are used. When the rear audio source is different from the front audio source, no sound comes out of the rear speakers 11. In this case, a rear user listens to sound from the rear audio source by using the wired headphone 12 or the wireless headphone 13.

The entertainment system 1 further comprises a DVD player 4 and a display device 5. The DVD player 4 is connected to the head unit 2 and the external input terminal unit 6. The DVD player 4 is provided below the dashboard (see FIG. 2(a)). A front user can operate the DVD player 4.

The display device 5 is connected to the rear controller 3. In the embodiment, the display device 5 is integrated with the rear controller 3 (see FIG. 2(b)). Alternatively, the display device may be provided in a location other than the location in which the rear controller 3 is provided. When the DVD player or an AUX input for providing video programs is selected as the rear audio source, video programs from the selected rear audio source are displayed on the screen of the display device 5.

The external input terminal unit 6 is provided in the rear seat area. The external input terminal unit 6 includes an external input terminal 7 to which an external device such as a video game machine or a video camera is connected, the headphone terminal 8 to which the wired headphone 12 is connected as described above, and a volume button 9. A rear user connects a video game machine or a video camera to the external input terminal 7 so as to enjoy the game or video programs on the screen of the display device 5. Audio and video signals from the video game machine or the video camera are sent to the head unit 2 via the DVD player 4. The head unit 2 sends the audio signal to the wired headphone 12 via the headphone terminal 8. The head unit 2 further sends the audio and video signals to the rear controller 3. The rear controller 3 sends the received audio signal to the wireless headphone 13 and sends the received video signal to the display device 5.

A front user and a rear user can connect an external audio player such as an MD player to the external input terminal 7. An audio signal from the MD player is sent to the head unit 2 via the DVD player 4. When the MD player is selected as the front audio source, the head unit 2 receives an audio signal from the MD player and sends it to the front and rear speakers 10 and 11. When the MD player is selected as the rear audio source, the head unit 2 sends the received audio signal to the wired headphone 12 via the headphone terminal 8. The head unit 2 also sends the audio signal to the rear controller 3. The rear controller 3 sends the audio signal to the wireless headphone 13 via infrared communications.

Head Unit

Figure 3:
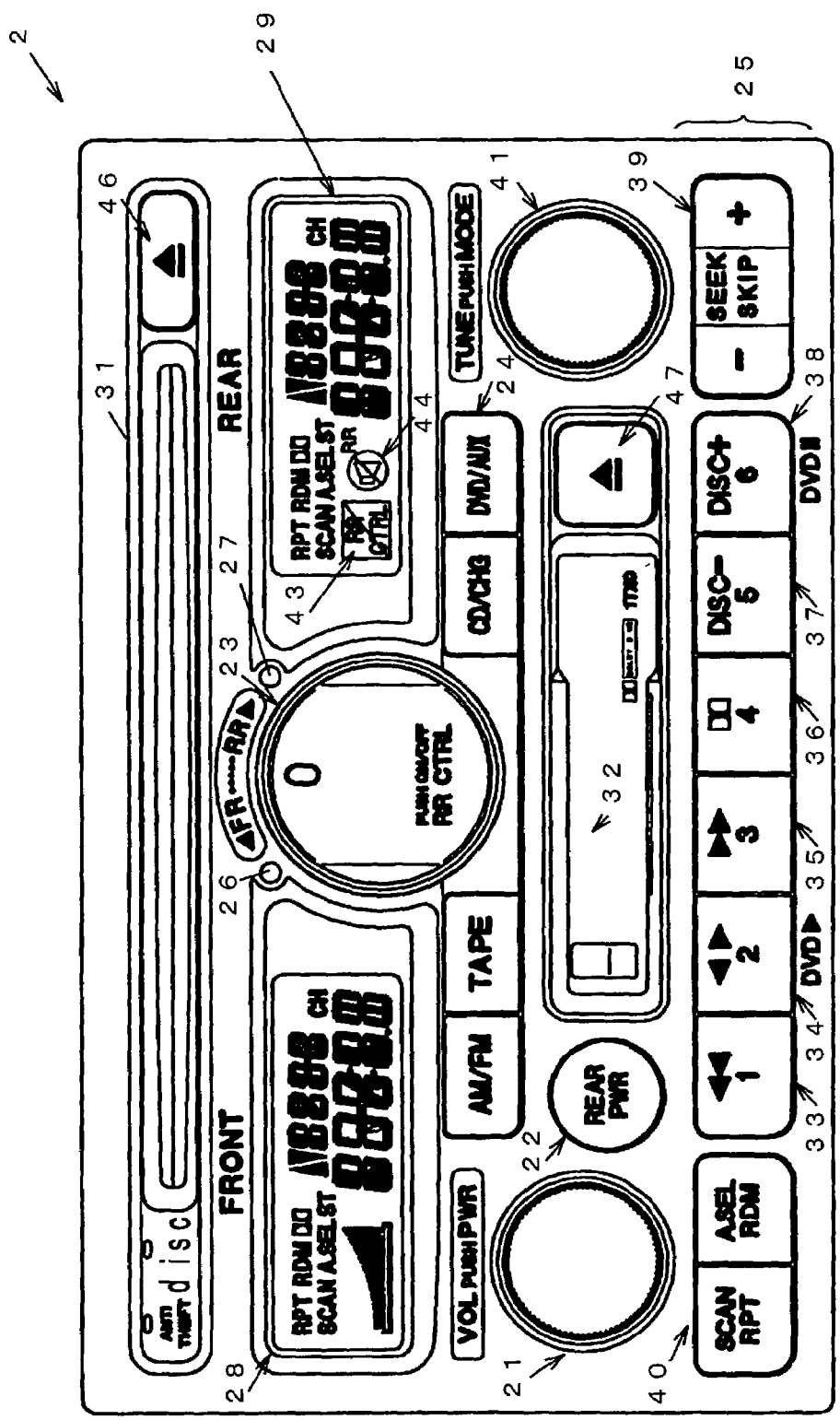
FIG. 3 is an operating panel of a head unit according to one embodiment of the invention.

FIG. 3 shows an operating panel of the head unit 2. The head unit 2 comprises a volume/power switch 21, a rear power switch 22, a control switch 23, audio source selection buttons 24, and audio source operating buttons 25. These buttons, including the audio source selection buttons 24 and audio source operating buttons 25, which define control of the audio sources may be collectively referred to as an audio source control button.

The volume/power switch 21 includes a function of switching the power of the entertainment system 1 between "on" and "off." The volume/power switch 21 also includes a function of adjusting the volume of the front and rear speakers 10 and 11 (FIG. 1). Specifically, every time the volume/power switch is pressed, the power of the entertainment system 1 is switched between on and off. In addition, by turning the volume/power switch 21 clockwise, the volume increases. By turning the volume/power switch 21 counterclockwise, the volume decreases.

The rear power switch 22 is a switch for switching the power of a rear system between "on" and "off." Here, the rear system comprises the rear controller 3, display device 5, external input terminal unit 6, and rear control functions that are provided by the head unit 2. The rear control functions of the head unit 2 include, for example, a function of displaying some indication in a rear display part 29. The rear power switch 22 enables activation and deactivation of the rear system to be operated by a front user. Thus, a front user can deactivate the rear system when, for example, a rear user falls asleep.

Figure 4:
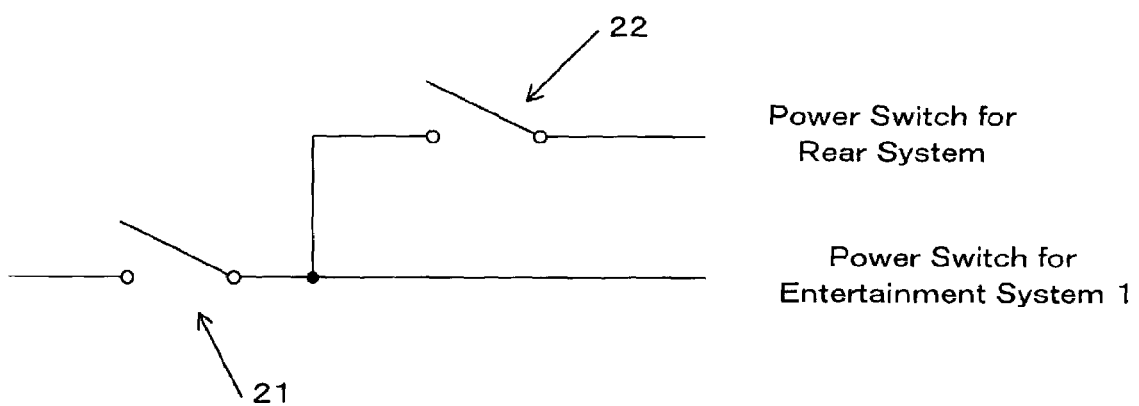
FIG. 4 is a diagram showing a relationship between the power of a head unit and the power of a rear controller according to one embodiment of the invention.

Referring to FIG. 4, a relationship between the volume/power switch 21 and the rear power switch 22 in one embodiment will be described. As can be seen from FIG. 4, if the rear power switch 22 is turned on (that is, the rear power switch 22 is pressed) when the entertainment system 1 is "on", turning on the rear system is allowed. In other words, when the entertainment system 1 is "off", the rear system cannot be activated even if the rear power switch 22 is pressed.

If the rear power switch 22 is turned off (that is, the rear power switch 22 is pressed again) when the rear system is "on", the rear system is turned off. However, since the entertainment system 1 remains "on", the front audio source can be controlled by the head unit 2.

If the volume/power switch 21 is pressed when the rear system is "on", the entire entertainment system including the rear system is turned off. Thus, when a user wants to listen to sound outside the vehicle, or in case of an emergency, the user can stop all the audio functions of the system 1 by simply pressing the volume/power switch 21.

The control switch 23 includes a function of switching between a front control mode and a rear control mode. Here, the front control indicates a control mode in which adjustment of volume by the volume/power switch 21 provided on the head unit 2 acts on the front audio source. In the front control mode, operation of the audio source selection buttons 24 and the audio source operating buttons 25 acts on the front audio source. The rear control indicates a control mode in which operation of the audio source selection buttons 24 and the audio source operating buttons 25 provided on the head unit 2 acts on the rear audio source. Thus, switching between the front control and the rear control through the control switch 23 allows both the front and rear audio sources to be controlled from the head unit 2.

When the front control is selected by the control switch 23, a front indicator 26 lights up (for example, in green). When the rear control is selected by the control switch 23, a rear indicator 27 lights up (for example, in amber). Thus, a user visually realizes which of the control modes is currently selected.

The control switch 23 also includes a function of switching between an enabled state in which operation of the rear controller 3 and remote controller 14 is enabled and a disabled state in which operation of the rear controller 3 and remote controller 14 is disabled. When the enabled state is selected by the control switch 23, the rear audio source can be controlled by the operating buttons provided on the rear controller 3 and the remote controller 14 (FIG. 1). Therefore, a rear user is allowed to control the rear audio source. When the disabled state is selected by the control switch 23, the rear controller 3 and the remote controller 14 are disabled (however, except a screen adjustment function for the screen of the display device 5). Therefore, a rear user cannot control the rear audio source. In the disabled state, the rear audio source can be controlled only by the head unit 2. Thus, in the disabled state, only a front user is allowed to control the rear audio source.

The audio source selection buttons 24 are used to select an audio source. An audio source herein includes an audio device for providing not only audio programs but also video programs. As described above, in the embodiment, selectable audio sources are an AM/FM radio, a cassette tape player, a CD (or CD changer (CHG)) player, a DVD player, and an AUX input. When the AUX input is selected, an external device (for example, a video camera, a video game machine, etc.) connected to the external input terminal 7 (FIG. 1) is selected. Since only one display device is provided in the example, either the DVD player or the AUX input is selected. When the DVD player or the AUX input is selected as the front audio source, a front user can enjoy only audio services from the DVD player or the connected external device (a front user cannot watch video on the screen of the display device). The AM/FM tuner, cassette player, and CD player are mounted on the head unit 2.

As shown in FIG. 3, the head unit 2 comprises an opening 31 to which a CD is inserted and an opening 32 to which a cassette tape is inserted. If a CD is inserted into the opening 31, the current audio source is switched to the CD even if "CD/CHG" of the audio source selection buttons 24 is not pressed. Similarly, if a cassette tape is inserted into the opening 32, the current audio source is switched to the cassette tape even if "TAPE" of the audio source selections 24 is not pressed.

For example, it is assumed that the FM radio is currently selected as the front audio source and the system is in the front control mode. If a CD is inserted into the opening 31, the front audio source is switched from the radio to the CD, playing the CD. Similarly, it is assumed that the FM radio is currently selected as the rear audio source and the system is in the rear control mode. If a CD is inserted into the opening 31, the rear audio source is switched from the radio to the CD, playing the CD.

If a DVD is inserted into the DVD player 4 (FIG. 1), the rear audio source is switched to the DVD, playing the DVD. A front user cannot enjoy video programs from the DVD. Therefore, if a DVD is inserted into the DVD player 4, the rear audio source is switched to the DVD even when the current control mode is the front control mode. Moreover, if a DVD is inserted into the DVD player 4 when the rear system is "off", the rear system is turned on. The DVD is selected as the rear audio source to play the DVD.

If a DVD is inserted into the DVD player 4 when the entertainment system 1 is "off", the entertainment system 1 and the rear system 1 are simultaneously turned on. In this case, the last selected audio source before the entertainment system 1 is turned off is selected as the front audio source. The rear audio source is the DVD.

The audio source operating buttons 25 are used to operate the selected audio source. The audio source operating buttons 25 include preset channel buttons 33 through 38 for the AM/FM radio, fast-rewind/play and reverse/fast-forward buttons 33 through 35 for a cassette tape, and a skip button 39 for selecting an AM/FM radio station and finding the beginning of a song included in a cassette tape or a CD.

In addition to the CD player, a CD changer may be provided. When the CD changer is provided, a desired CD is selected by disk selection buttons 37 and 38. Repeat/random buttons 40 are buttons for playing repeatedly and randomly, respectively. When a "TUNE" button 41 is pressed, a mode for adjusting sound quality and sound image is implemented. By turning the TUNE button 41 to the left or the right, a radio station can be manually selected. These buttons 37 through 41 are also included in the audio source operating buttons 25.

Figure 5:
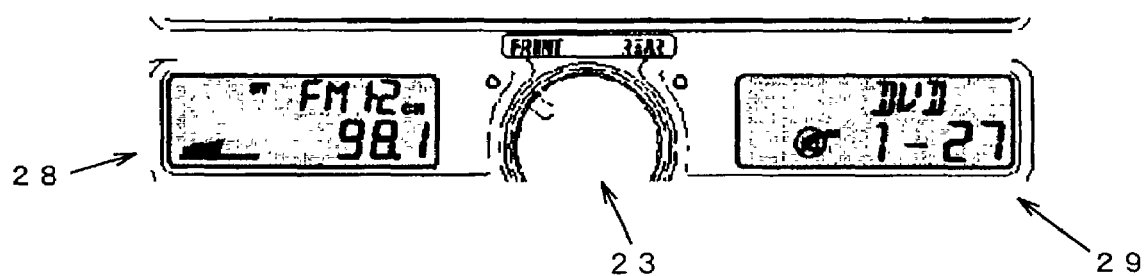
FIG. 5 is a diagram showing a display example of a twin display of a head unit according to one embodiment of the invention.

The head unit 2 further comprises a twin display including a front display part 28 and a rear display part 29. The front display part 28 shows the kind and operating state of the front audio source. The rear display part 29 shows the kind and operating state of the rear audio source. Referring to FIG. 5, a display example of the twin display is illustrated. FIG. 5 shows a state in which channel 2 of FM1 is selected as the front audio source and title number 1/chapter number 27 of a DVD is selected as the rear audio source. Thus, a front user can easily check not only the state of the front audio source but also the state of the rear audio source.

Referring to FIG. 3 again, an indication 43 is shown in the rear display part 29 when operation of the rear controller 3 and remote controller 14 is disabled. An indication 44 shows a state in which no sound comes out of the rear speakers 11 (FIG. 1). Specifically, when the rear audio source is different from the front audio source, sound does not come out of the rear speakers 11 so as to prevent interference between sound from the front speakers 10 and sound from the rear speakers 11. In this case, the sound from the rear audio source is delivered to the headphones 12 and 13 (FIG. 1). In such a state, the indication 44 is shown in the rear display part 29.

Figure 6:
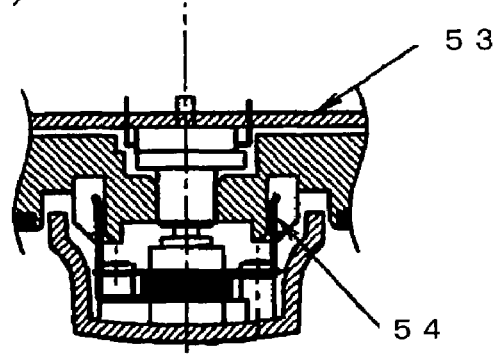
FIG. 6 is a diagram showing a structure of a control switch according to one embodiment of the invention.
Figure 6:
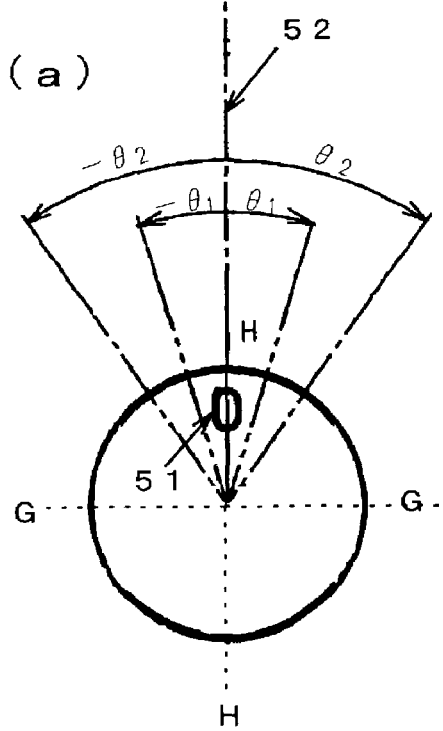
Figure 6:
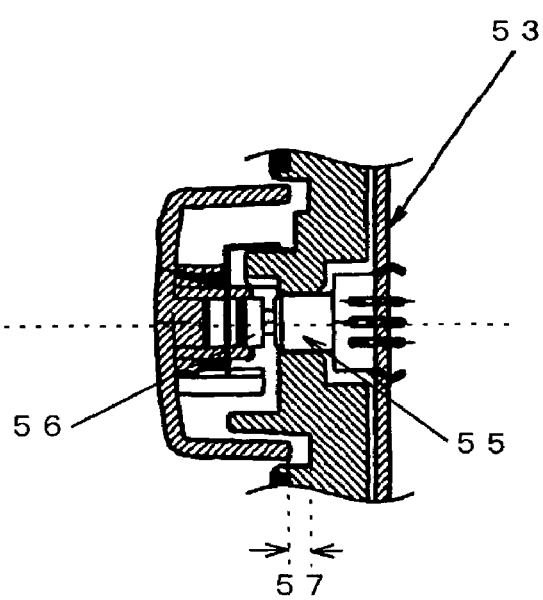

FIG. 6 shows an example of a structure of the control switch 23. As described above, the control switch 23 includes a function of switching between the front control and the rear control. The control switch 23 also includes a function of switching between the enabled state and the disabled state of the rear controller 3 and the remote controller 14. The former function is implemented by turning the control switch 23 to the left or the right. The latter function is implemented by pressing the control switch 23.

FIG. 6(a) shows a front view of the control switch 23. FIG. 6(b) shows a section view of the control switch 23 taken along the line G—G. FIG. 6(c) shows a section view of the control switch 23 taken along the line H—H. When the control switch 23 is not operated, an indication 51 provided at the center of the control switch 23 points to a neutral position 52. When the control switch is turned clockwise by more than a predetermined angle θ1 from the neutral position 52, a self-returning volume 55 provided on a printed circuit board rotates, outputting a signal for selecting the rear control. A stopper (not shown) is provided in the control switch 23 so as to prevent the switch 23 from being turned clockwise by more than a predetermined angle θ2 from the neutral position 52.

Similarly, when the control switch 23 is turned counterclockwise by more than the predetermined angle θ1 from the neutral position 52 (which may be represented by |−θ1| wherein the minus sign indicates that a direction to which the switch is turned is opposite to the direction of the above case), the self-returning volume 55 rotates, outputting a signal for selecting the front control mode. A stopper (not shown) is provided in the control switch 23 so as to prevent the switch from being turned counterclockwise by more than the predetermined angle θ2 from the neutral position 52 (which may be represented by |−θ2|).

A spring 54 is provided in the control switch 23. When a user moves his/her hand off the control switch after the switch is turned clockwise or counterclockwise, the switch 23 returns to a position in which the indication 51 points to the neutral position 52 by the action of the spring 54.

On the other hand, as shown in FIGS. 6(b) and (c), every time the control switch 23 is pressed, a protruded portion 56 pushes the volume 55, issuing a signal for switching between the enabled state and the disabled state. The amount of displacement of the volume 55 in pressing the control switch 23 is shown by reference number 57. Thus, the control mode of the system is switched between the front control and the rear control by turning the control switch 23 to the left or the right by more than a predetermined angle. Every time the control switch 23 is pressed, operation states of the rear controller 3 and the remote controller 14 are switched between the enabled state and the disabled state.

Rear Controller

Figure 7:
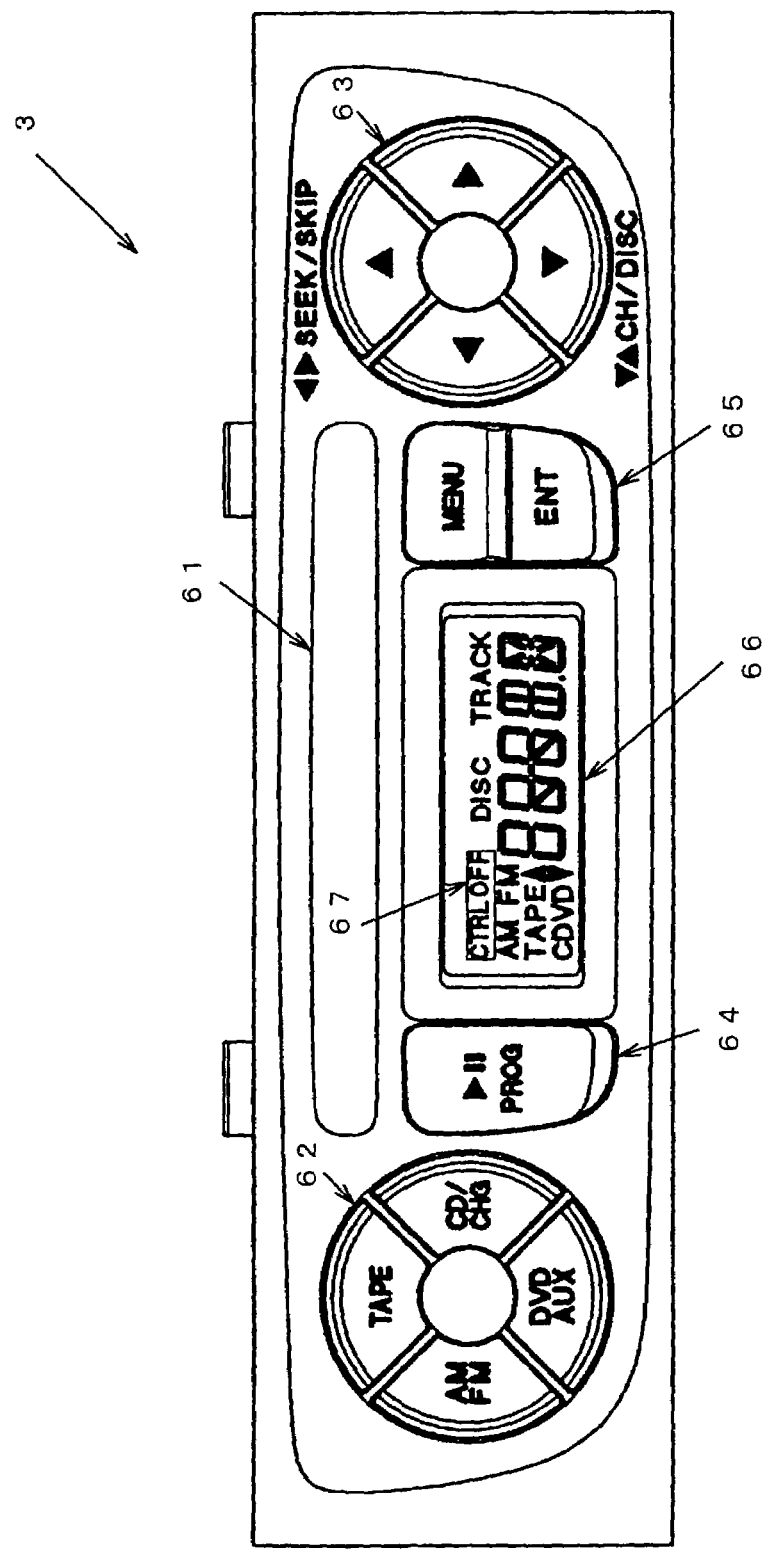
FIG. 7 is a diagram showing an operating panel of a rear controller according to one embodiment of the invention.

FIG. 7 shows an operating panel 3 of the rear controller 3. The rear controller 3 includes an infrared transceiver 61. The rear controller 3 communicates with the wireless headphone 13 (FIG. 1) through the infrared transceiver 61. Thus, a rear user can listen to sound without a burdensome cord extending from a headphone.

The rear controller 3 further includes rear audio source selection buttons 62 and rear audio source operating buttons 63 through 65. The rear audio source selection buttons 62 are used to select the rear audio source. Selectable audio sources are the AM/FM radio, the CD player, the cassette tape player, the DVD player and the AUX input, which are the same as the audio sources selectable on the head unit 2. The rear audio source operating buttons 63 through 65 are used to operate the selected rear audio source. A user uses the buttons 63 to select a preset channel of the AM/FM radio, operate a menu of the DVD, and operate a cassette tape and a CD such as finding of the beginning of a song, rewinding and forwarding a cassette tape. A user uses the button 64 to play or reverse a cassette tape. A user also uses the buttons 65 to select an item shown in a menu of a DVD.

The rear controller 3 further comprises a display 66. The display 66 shows the kind and operating state of the selected rear audio source. When the rear controller 3 and the remote controller 14 are disabled by the control switch 23 of the head unit 2, the display 66 shows an indication 67 of "CTRL OFF." When the indication 67 is displayed, the rear controller 3 is in the disabled state (however, as described above, except the screen adjusting function). Specifically, even if the rear audio source selection buttons 62 and the rear audio source operating buttons 63 through 65 are pressed, a user cannot control the rear audio source. Even if the remote controller 14 is used, a user cannot control the rear audio source.

Thus, for example, when a small child sits in the rear seat, or when the driver does not want a rear user to operate the rear controller 3 and the remote controller 14 just for fun, the driver places the rear controller 3 and the remote controller 14 in the disabled state to prevent the rear user from selecting and operating the rear audio source.

Figure 8:
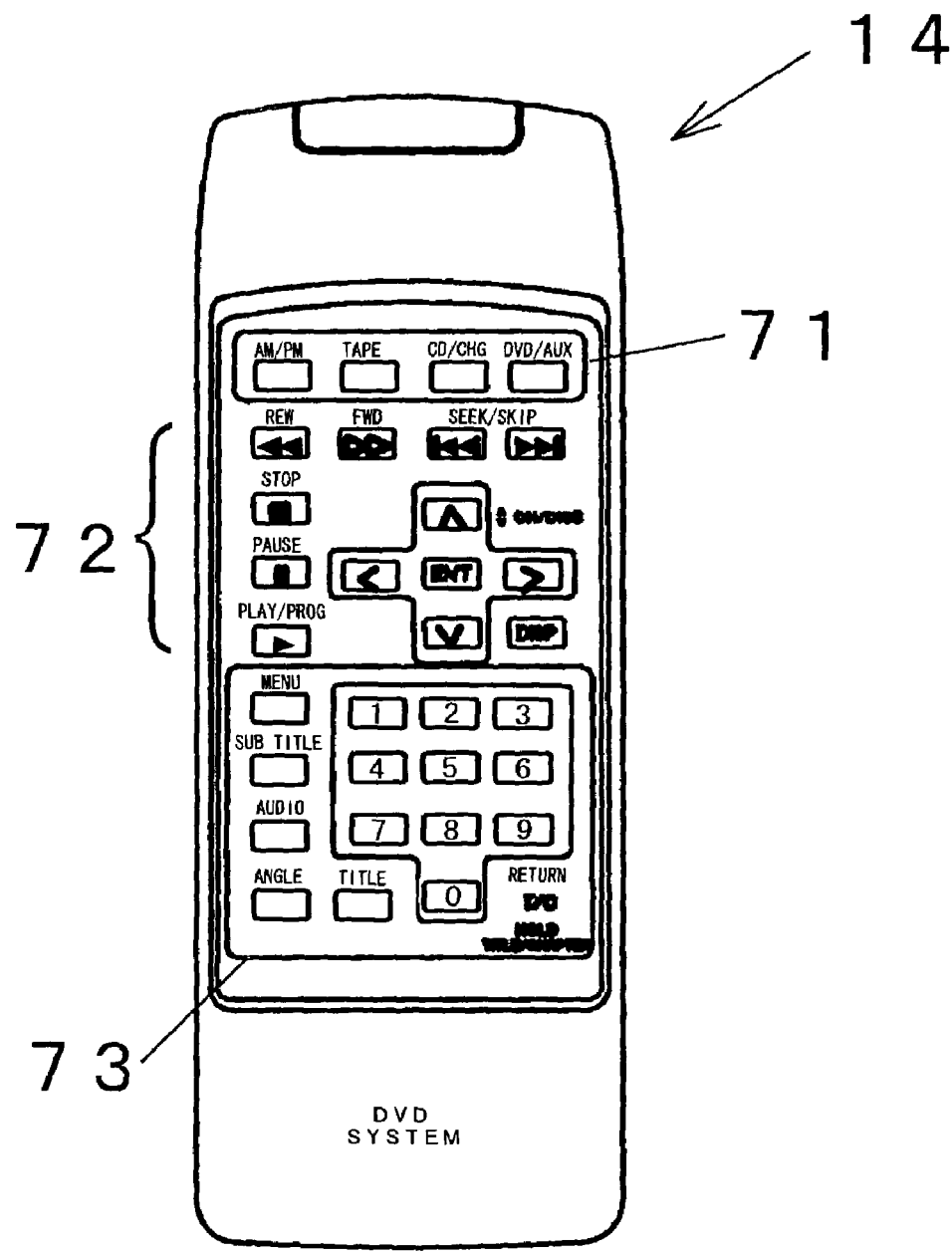
FIG. 8 is a diagram showing a remote controller according to one embodiment of the invention.

FIG. 8 shows placement of buttons of the remote controller 14. The remote controller 14 includes rear audio source selection buttons 71, rear audio source operating buttons 72 and 73. Operating buttons within a rectangular region 73 are used to operate the DVD player 4 (FIG. 1).

Connection Form of System

Figure 9:
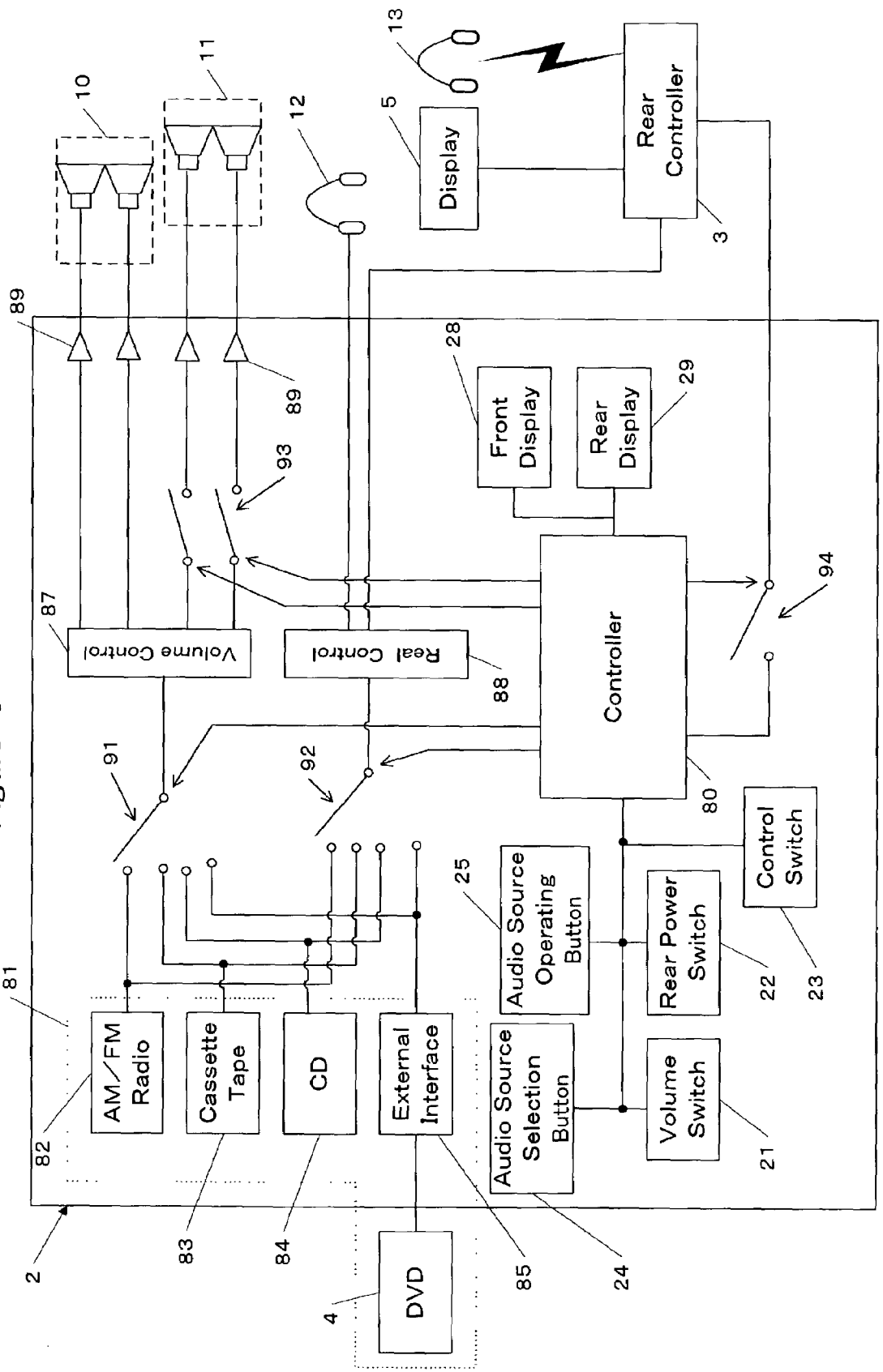
FIG. 9 is a diagram showing a connection form of an entertainment system according to one embodiment of the invention.

FIG. 9 shows a connection form of components included in the entertainment system according to one embodiment of the invention. The head unit 2 comprises a controller 80. The controller 80 typically comprises a microprocessor (MPU), a read-only memory (ROM) for storing control programs and control data, and a random-access memory (RAM) for providing work areas for operation and for temporarily storing various data. An audio source 81 includes an AM/FM tuner 82, a cassette player 83, a CD player 84, and the DVD player 4 that is connected via an external interface 85, as described above.

For the sake of simplicity, other external devices are not shown in FIG. 9. However, as described above, an external device such as a video camera or a video game machine may be connected to the head unit 2 through the external terminal unit 6 and the DVD player 4 (FIG. 1). A specific external interface for a CD changer may be provided in the head unit 2 to connect the CD changer to the head unit 2 via the external interface.

The controller 80 is connected to the volume/power switch 21 (which may be referred to as a "volume switch" or "power switch" in accordance with its function). The controller 80 is also connected to the rear power switch 22, control switch 23, audio source selection buttons 24, and audio source operating buttons 25. The controller 80 receives signals through these switches and buttons.

A volume signal is received by the controller 80 through the volume switch 21. A volume control part 87 receives the volume signal from the controller 80. The volume control part 87 also receives an audio signal from the connected front audio source. The volume control part 87 amplifies the audio signal in accordance with the volume signal and outputs the amplified signal to the front and rear speakers 10 and 11 via amplifiers 89.

A rear control part 88 receives an audio signal from the connected rear audio source and sends it to the wired headphone 12 and the rear controller 3. The rear controller 3 sends the received audio signal to the wireless headphone 13 via infrared communications. The rear control part 88 receives a video signal from the connected rear audio source and sends it to the rear controller 3. The rear controller 3 outputs the received video signal to the display device 5.

The front display part 28 and the rear display part 29 (FIG. 3) are connected to the controller 80. The front and rear display parts 28 and 29 show operating states of the front and rear audio sources, respectively, in accordance with control signals from the controller 80.

A front audio source switch 91 is provided between the audio source 81 and the volume control part 87. The switch 91 selects the front audio source to be connected to the volume control part 87 in accordance with a control signal from the controller 80.

A rear audio source switch 92 is provided between the audio source 81 and the rear control part 88. The switch 92 selects the rear audio source to be connected to the rear control part 88 in accordance with a control signal from the controller 80.

A speaker switch 93 is provided between the volume control part 87 and the rear speakers 11. The switch 93 switches between connection and disconnection of the rear speakers 11 to and from the volume control part 87.

A rear control switch 94 is provided between the controller 80 and the rear controller 3. The switch 94 switches between connection and disconnection of the controller 80 to and from the rear controller 3. The controller 80 turns on the switch 94 to place operation of the rear controller 3 and the remote controller 14 in the enabled state. On the other hand, the controller 80 turns off the switch 94 to place the rear controller 3 and the remote controller 14 in the disabled state.

Referring to FIGS. 9 through 13, various control of the entertainment system according to one embodiment of the invention will be described.

Front Control and Rear Control

As described above, the control switch 23 switches between the front control in which operation on the head unit 2 acts on the front audio source and the rear control in which operation on the head unit 2 acts on the rear audio source.

Figure 10:
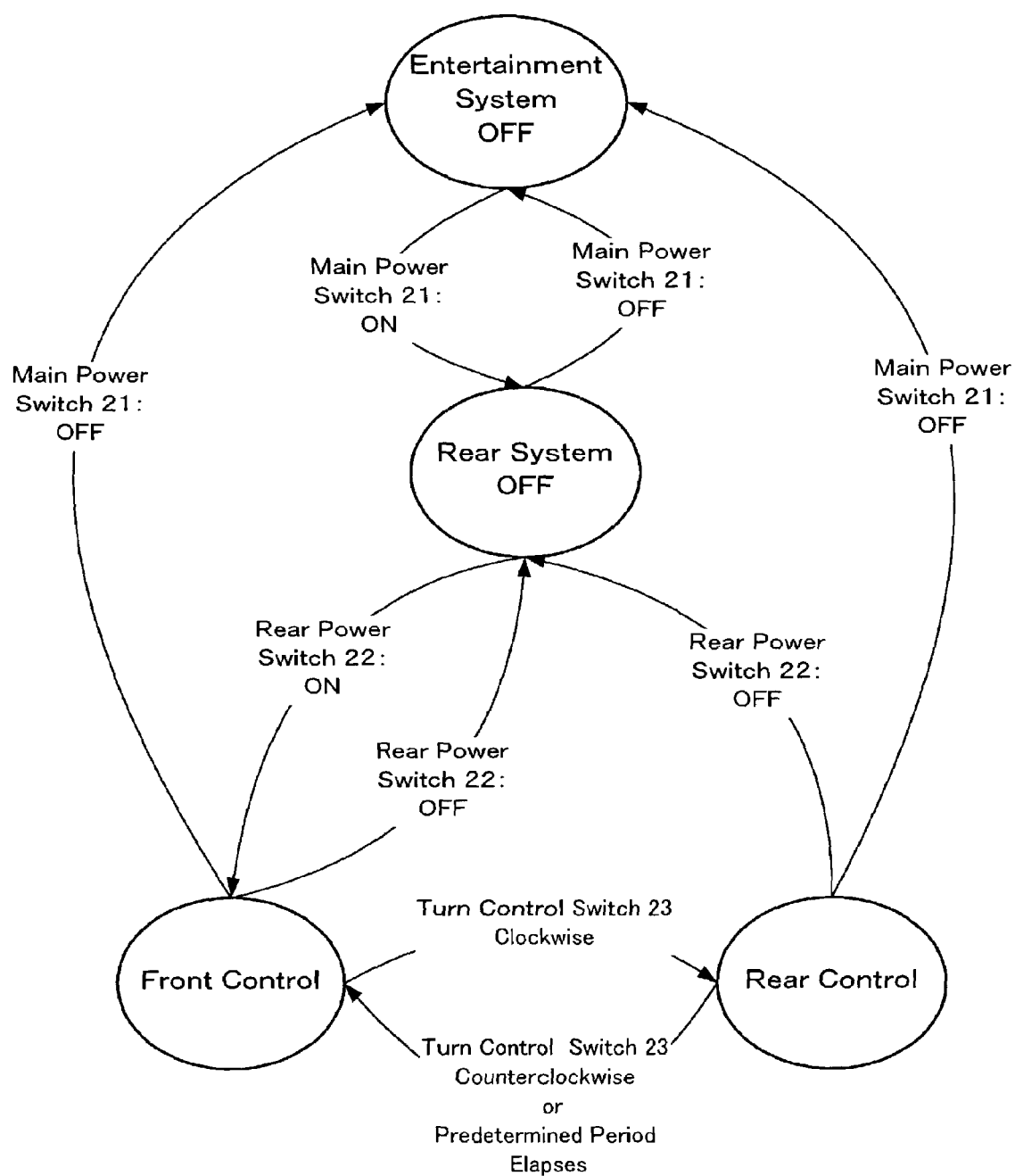
FIG. 10 is a state transition diagram of a control mode of an entertainment system according to one embodiment of the invention.

FIG. 10 shows a state transition diagram of the control mode of the entertainment system 1. When the power switch 21 is pressed to turn on the entertainment system 1 and the rear power switch 22 is turned on, the entertainment system 1 enters the front control mode.

If the control switch 23 is turned clockwise by more than a predetermined angle when the entertainment system 1 is in the front control mode, the control mode shifts to the rear control mode.

If the control switch 23 is turned counterclockwise by more than a predetermined angle when the entertainment system 1 is in the rear control mode, the control mode shifts to the front control mode. If the head unit 2 is not operated for a predetermined time period (for example, 10 seconds), the control mode automatically shifts to the front control mode.

If the rear power switch 22 is pressed when the entertainment system 1 is in the front or rear control mode, the rear system is turned off. If the power switch 21 is pressed when the entertainment system 1 is in the front or rear control mode, the entire entertainment system is turned off.

Thus, since the control mode of the system defaults to the front control mode, ease of operation for a front user is improved.

Referring to FIG. 9 again, operation in the front control mode will be described. When the entertainment system 1 and then the rear system are turned on, the controller 80 sets the front control flag to one to enter the front control mode. The front control flag is also set to one if the front control mode is selected by the control switch 23 when the entertainment system 1 and the rear system are "on." The controller 80 turns on the front indicator 26 (FIG. 3), informing a front user that the front control mode is currently selected.

It may be arbitrarily determined which audio source is connected to the front audio source switch 91 when the entertainment system 1 enters the front control mode by turning on the entertainment system 1 and the rear system. In one example, the kind of the last selected audio source is stored in a memory before the entertainment system 1 is turned off. When the entertainment system 1 is turned on again, the kind of the last selected audio source is read out so that the front audio source switch 91 selects it.

It may be arbitrarily determined which audio source is connected to the rear audio source switch 92 when the entertainment system 1 enters the front control mode by turning on the entertainment system 1 and the rear system. In one example, the kind of the last selected audio source is stored in a memory before the rear system is turned off. In another example, the same audio source as the front audio source selected when the rear system is turned on is selected. The selection of the rear audio source may be performed by the controller 80 or the rear controller 3. When the rear controller 3 selects the rear audio source, the controller 80 receives a control signal indicating the kind of the rear audio source selected by the rear controller 3. The controller 80 sets the rear audio source switch 92 in accordance with the received control signal.

If the controller 80 receives a signal through the audio source selection buttons 24 after the entertainment system 1 enters the front control mode, it sets the front audio source switch 91 in accordance with the received signal. If the controller 80 receives a signal through the audio source operating buttons 25 after the entertainment system 1 enters the front control mode, it sends the received signal to the connected front audio source via the front audio source switch 91. Furthermore, the controller 80 receives a volume signal through the volume switch 21 and sends the signal to the volume control part 87. The volume control part 87 adjusts the volume of sound from the front and rear speakers 10 and 11 in accordance with the received volume signal. Thus, an audio signal from the front audio source is sent to the front and rear speakers 10 and 11.

If the rear audio source is switched by the audio source selection buttons 62 (FIG. 7) of the rear controller 3 or the audio source selection buttons 71 of the remote controller 14 after the system enters the front control mode, a control signal indicating the selected rear audio source is sent from the rear controller 3 to the controller 80. The controller 80 sets the rear audio source switch 92 in accordance with the received control signal. If the rear audio source is operated through the audio source operating buttons 63 through 65 of the rear controller 3 or the audio source operating buttons 72 and 73 of the remote controller 14, a control signal indicating the operation is sent from the rear controller 3 to the controller 80. The controller 80 sends the received control signal to the rear audio source via the rear audio source switch 92. Thus, an audio signal from the rear audio source is sent to the wired headphone 12 and wireless headphone 13 via the rear control part 88. A video signal from the rear audio source is sent to the display device 5 via the rear control part 88.

If a DVD is inserted into the DVD player 4 in the front control mode, the controller 80 sets the rear audio source switch 92 to select the external interface 85 coupled to the DVD player 4. Since the entertainment system 1 is in the front control mode, signal inputs through the audio source selection buttons 24 and audio source operating buttons 25 act on the front audio source unless the control mode is switched to the rear control mode by the control switch 23. Alternatively, in response to insertion of a DVD into the DVD player, the control mode may be switched to the rear control mode.

Next, the rear control mode will be described. If the control switch 23 is turned clockwise by more than a predetermined angle when the entertainment system 1 is in the front control mode, the controller 80 resets the front control flag and sets the rear control flag to shift to the rear control mode. The controller 80 turns off the indicator 26 and turns on the indicator 27 of the head unit 2 to indicate that the entertainment system 1 is in the rear control mode.

If the controller 80 receives a signal through the audio source selection buttons 24 of the head unit 2 after the entertainment system 1 enters the rear control mode, the controller 80 sets the rear audio source switch 92 in accordance with the received signal. If the controller 80 receives a signal through the audio source operating buttons 25 after the entertainment system 1 enters the rear control mode, the controller 80 sends the received signal to the rear audio source via the rear audio source switch 92. Thus, even when the entertainment system 1 is in the rear control mode, the rear audio source can be controlled by the head unit 2.

In both the front and rear control modes, the speaker switch 93 is turned on/off by the controller 80 according to whether the front and rear audio sources are the same. In both the front and rear control modes, the rear control switch 94 is turned on/off by the controller 80 according to which of the enabled state or the disabled state is selected by the control switch 23.

Figure 11:
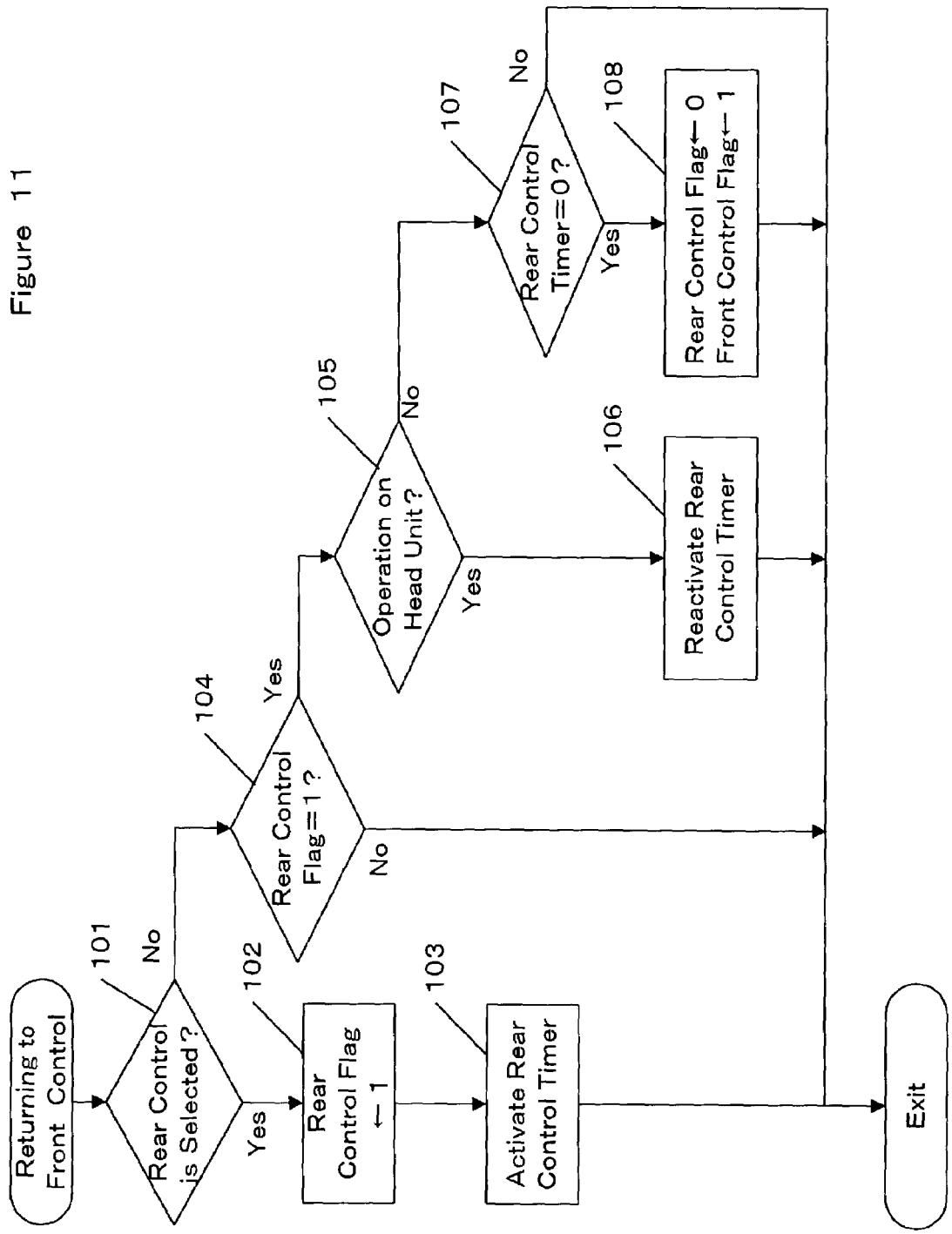
FIG. 11 is a flowchart showing a process for returning from a rear control mode to a front control mode according to one embodiment of the invention.

As described above referring to FIG. 10, if there is no operation on the head unit 2 for a predetermined time period after the entertainment system 1 enters the rear control mode, the system 1 automatically shifts to the front control mode. Referring to FIG. 11, a process for returning to the front control mode performed by the controller 80 will be described. The process is performed at a predetermined time interval (for example, 100 milliseconds).

In step 101, it is determined whether a signal indicating that the rear control mode is selected by the control switch 23 is received. If the signal is received, the rear control flag is set to one (102). The process proceeds to step 103, in which a rear control timer is activated. The rear control timer is a count-down timer in which a predetermined time (for example, 10 seconds) is set.

If the signal is not received in step 101, the rear control flag is examined (104). If the value of the rear control flag is not one, it indicates that the current control mode is the front control mode. Therefore, the process exits the routine. If the value of the rear control flag is one in step 104, it indicates that the current control mode is the rear control mode.

The process proceeds to step 105, in which it is determined whether operation on the head unit 2 has been performed. For example, it is determined whether a signal has been received through the audio source selection buttons 24 or the audio source operating buttons 25. If the signal has been received, the rear control timer is reactivated (106), exiting the routine. If no signal has been received, it indicates that no operation has been performed on the head unit 2.

The process proceeds to step 107, in which it is determined whether the value of the rear control timer is zero. If so, it indicates that no operation for the rear audio source has been performed on the head unit 2 for the predetermined time period. In this case, the process proceeds to step 108, in which the rear control flag is set to zero and the front control flag is set to one, shifting from the rear control mode to the front control mode. If the value of the rear control timer is not zero in step 107, the process exits the routine.

Thus, the rear audio source can be controlled by the head unit provided in the front seat area. For example, when a small child or a user who is unfamiliar with operating the system sits in the rear seat, a front user can assist the rear user in operating the rear controller and the remote controller. Since the driver who owns the vehicle is familiar with operating the system, the driver can operate the rear audio source for a rear user who is unfamiliar with operating the system.

Enabling/Disabling Operation of Rear Controller and Remote Controller

Figure 12:
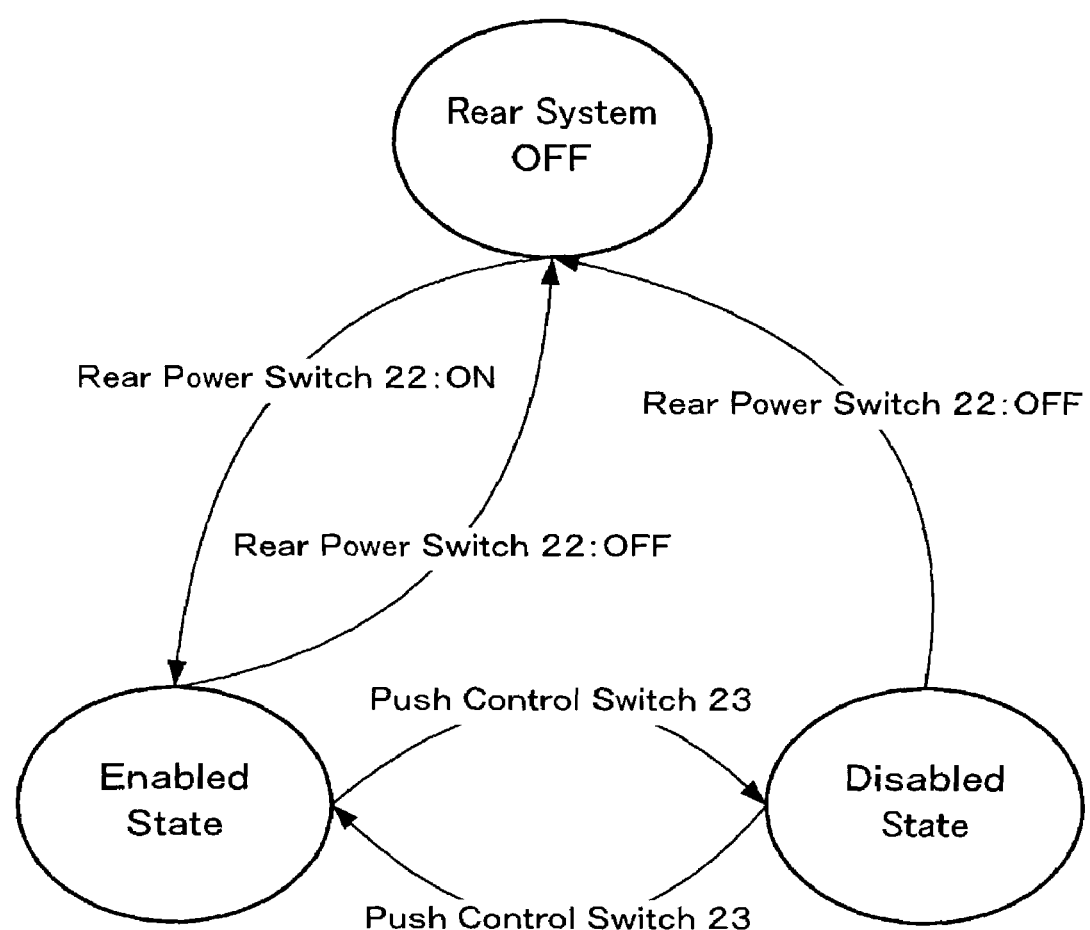
FIG. 12 is a state transition diagram of a rear controller according to one embodiment of the invention.

As described above, operation of the rear controller 3 and remote controller 14 is limited by pressing the control switch 23. FIG. 12 shows a state transition diagram of the rear controller 3. If the rear power switch 22 is pressed when the rear system is "off", the rear system is turned on. At this time, the rear controller 3 enters the enabled state in which operation of the rear controller is enabled. If the control switch 23 is pressed when the rear controller 3 is in the enabled state, the rear controller 3 shifts from the enabled state to the disabled state. If the control switch 23 is pressed when the rear controller 3 is in the disabled state, the rear controller 3 shifts from the disabled state to the enabled state. Thus, every time the control switch 23 is pressed, the state of the rear controller 3 is switched between the enabled state and the disabled state.

Alternatively, the last state (the enabled state or the disabled state) before the rear system is turned off may be stored. When the rear system is turned on again, the state of the rear system may return to the stored state.

Referring to FIG. 9, operation of switching between the enabled state and the disabled state will be described. The entertainment system 1 is turned with the press of the power switch 21. If the rear power switch 22 is pressed, the controller 80 turns on the rear control switch 94 and sends a control signal for turning on the rear system to the rear controller 3. As a result, the rear system is turned on. Specifically, the rear controller 3, display device 5 and the external input terminal unit 6 are turned on. The rear controller 3 selects the rear audio source and sends a control signal indicating the selected audio source to the controller 80 via the rear control switch 94. The controller 80 sets the rear audio source switch 92 in accordance with the control signal received from the rear controller 3. The controller 80 displays a state of the rear audio source in the rear display part 29 of the head unit 2. As described above, it may be arbitrarily determined which audio source is selected when the rear system is turned on.

When the rear system is turned on, the rear controller 3 enters the enabled state. If any one of the rear audio source selection buttons 62 and the rear audio source operating buttons 63 through 65 (FIG. 7) provided on the rear controller 3 is operated, a signal input through the button is sent from the rear controller 3 to the controller 80 via the rear control switch 94. The controller 80 sends the received signal to the rear audio source via the rear audio source switch 92. Thus, operation on the rear controller 3 acts on the rear audio source.

If the control switch 23 is pressed when the rear controller 3 is in the enabled state, the controller 80 sends a control signal for informing the rear controller 3 that the disabled state is selected. The controller 80 then turns off the rear control switch 94. As a result, the rear controller 3 enters the disabled state. The controller 80 displays the indication 43 (FIG. 3) in the rear display 29 of the head unit 2, indicating that operation of the rear system is disabled. When the rear controller 3 receives the control signal indicating that the disabled state is selected, it displays the indication 67 of "CTRL OFF" in the display 66 (FIG. 7) of the rear controller 3.

When the rear controller is in the disabled state, communication between the controller 80 and the rear controller 3 is disconnected. Therefore, the controller 80 cannot receive a control signal issued by the rear controller 3. Thus, operation of the rear controller 3 is disabled.

Since the system can be switched so that only a front user is authorized to control the rear audio source, misoperation and unintentional operation of the rear controller by a small child or a user who is unfamiliar with the system are prevented.

If the control switch 23 is pressed when the rear controller is in the disabled state, the controller 80 turns on the rear control switch 94 and sends a control signal for informing the rear controller that the enabled state is selected. The controller 80 clears the indication 43 from the rear display 29. The rear controller 3 clears the indication 67 from the display 66.

Alternatively, when the rear controller 3 enters the disabled state, an operation limitation flag indicating that no signal from the rear controller 3 is accepted may be set. If the controller 80 receives a signal from the rear controller 3 while the rear operation limitation flag is set, the signal is disabled (or discarded). In this case, the rear control switch 94 may not be provided. When the rear controller 3 shifts to the enabled state, the rear operation limitation flag may be reset.

Function of Switching Speakers

Figure 13:
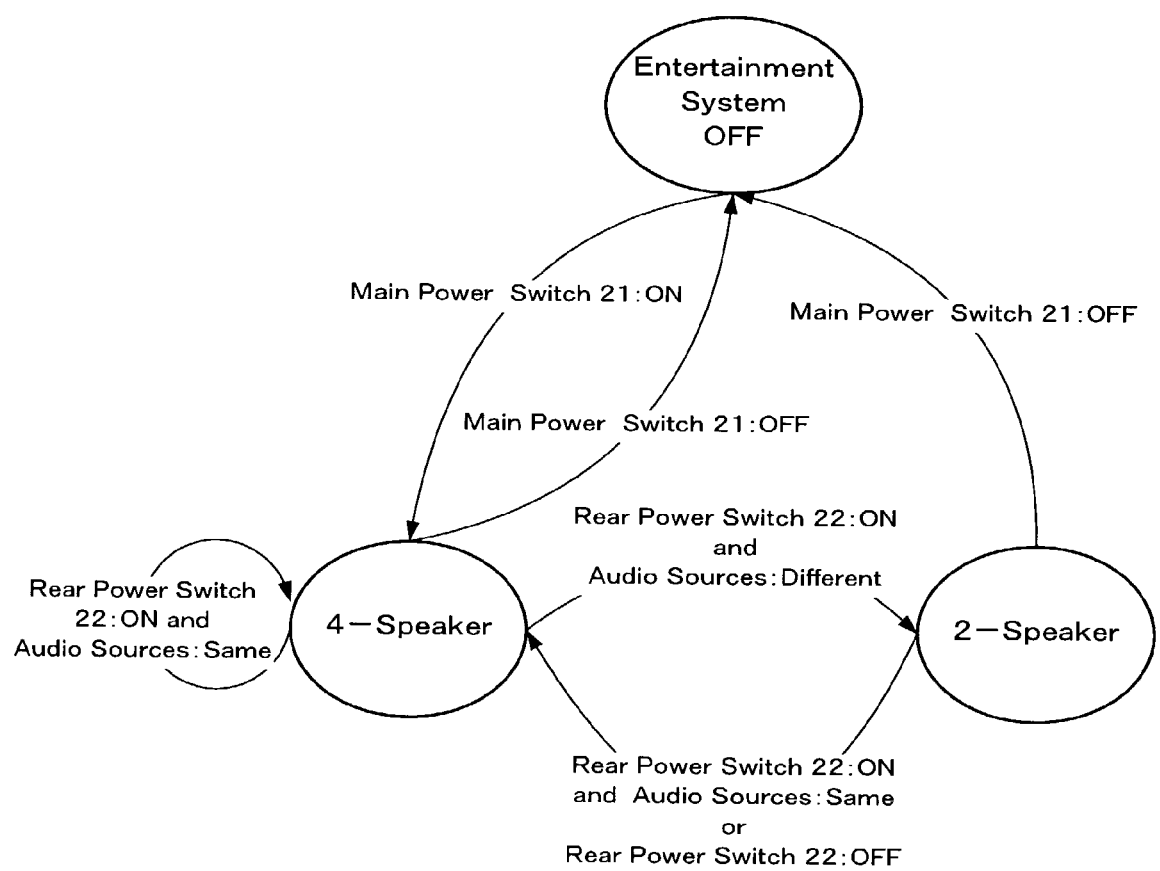
FIG. 13 is a state transition diagram of speakers according to one embodiment of the invention.

A function of switching the speakers will be described. FIG. 13 shows a state transition diagram of the speakers. When the entertainment system 1 is turned on with the press of the power switch 21, the front and rear speakers 10 and 11 are connected to the front audio source, implementing a 4-speaker state. In the 4-speaker state, sound from the front audio source comes out of both the front and rear speakers 10 and 11.

If the rear system is turned on by the rear power switch 22 and the rear audio source is the same as the front audio source, the 4-speaker state is maintained.

In this embodiment, if the rear power switch 22 is pressed to turn on the rear system, sound from the rear audio source comes out of the headphones 12 and 13. That is, even in the 4-speaker state, sound from the rear audio source comes out of the headphones 12 and 13. Alternatively, in the 4-speaker state, the system may be configured to prevent sound from coming out of the headphones 12 and 13.

If the rear system is turned on with the press of the rear power switch 22 in the 4-speaker state and the rear audio source is different from the front audio source, the two rear speakers 11 are disconnected, implementing a 2-speaker state in which only the two front speakers 10 are connected to the front audio source. Sound from the rear audio source comes out of the headphones 12 and 13.

If another audio source is selected as the front or rear audio source by the audio source selection buttons 24 of the head unit 2 when the front and rear audio sources are the same in the 4-speaker state, the front audio source becomes different from the rear audio source. If another audio source is selected as the rear audio source by the audio source selection buttons 62 and 71 of the rear controller 3 and the remote controller 14 when the front and rear audio sources are the same in the 4-speaker state, the rear audio source becomes different from the front audio source. In these cases, the speaker state shifts to the 2-speaker state in response to the press the audio source selection button.

On the other hand, if the front and rear audio sources become the same with the press of one of the audio source selection buttons of the head unit 2, rear controller 3 or remote controller 14 when the system is in the 2-speaker state, the two rear speakers 11 are connected to the front audio source to shift to the 4-speaker state. If the rear power switch 22 is pressed to turn off the rear system when the system is in the 2-speaker state, the system 1 shifts to the 4-speaker state.

Switching between the 4-speaker state and the 2-speaker state may be manually performed. In one example, if the rear power switch 22 continues to be pressed for a predetermined time period (for example, two seconds) when the system is in the 4-speaker state, the system 1 shifts to the 2-speaker state. If the rear power switch 22 continues to be pressed for the predetermined time period when the system is in the 2-speaker state, the system 1 shifts to the 4-speaker state.

In the manual switching, it is preferable that selecting the 4-speaker state is not allowed when the front and rear audio sources are different. This is because interference occurs between sound from the front speakers 10 and sound from the rear speakers 11 when the 4-speaker state is selected.

Referring to FIG. 9, operation of switching the speakers will be described. When the power switch 21 of the head unit 2 is pressed, the entertainment system 1 is turned on. The controller 80 connects the front audio source switch 91 to a predetermined audio source. The controller 80 also turns on speaker switch 93 to connect the rear speakers 11 to the front audio source. As described above, the predetermined audio source may be arbitrarily decided. Thus, sound from the selected front audio source comes out of the front and rear speakers 10 and 11. The controller 80 displays the kind and operating state of the selected audio source in the front display part 28.

If the rear power switch 22 is pressed, the controller 80 turns on the rear system and receives a control signal indicating a selected audio source from the rear controller 3. As described above, selection of the rear audio source when the rear system is turned on may be arbitrarily decided.

The controller 80 compares the rear audio source with the front audio source. If the selected front and rear audio sources are the same, the controller 80 connects the rear audio source switch 92 to the front audio source without turning off the speaker switch 93. Sound from the front audio source comes out of the front and rear speakers 10 and 11. Sound from the rear audio source also comes out of the headphones 12 and 13. That is, the sound from the headphones 12 and 13 is the same as the sound from the speakers 10 and 11. The controller 80 displays the kind and operating state of the rear audio source in the rear display part 29. In this case, the same operating state of the same audio source is displayed in the front and rear display parts 28 and 29.

On the other hand, if the front and rear audio sources are different, the controller 80 turns off the speaker switch 93 and connects the rear audio source switch 92 to the rear audio source. Thus, since the rear speakers 11 are disconnected from the front audio source, the sound from the front audio source comes out of only the front speakers 10. Sound from the rear audio source comes out of the headphones 12 and 13. The controller 80 displays the kind and operating state of the rear audio source in the rear display part 29. The controller 80 also displays the indication 44 (see FIG. 3) indicating that the rear speakers 11 are "off" in the rear display part 29 of the head unit 2.

The comparison of the front audio source and the rear audio source is performed every time the front audio source or the rear audio source is switched. Specifically, the comparison is performed whenever any one of the audio source selection buttons 24 of the head unit 2, the audio source selection buttons 62 of the rear controller 3, and the audio source selection buttons 71 of the remote controller 14 is operated. In response to insertion of a medium such as a CD, cassette tape, or DVD into the player, or in response to ejection of the medium, the switching of the front audio source and/or the rear audio source may occur. The comparison is also performed in such a case. The controller turns on or off the speaker switch 93 in accordance with the result of the comparison.

Thus, since the speakers are automatically switched according to the selection of the front and rear audio sources, a user can enjoy a comfortable audio environment. When the front and rear audio sources are the same, the 4-speaker state is automatically implemented. Occupants in the vehicle listen to a more realistic sound. When the front and rear audio sources are different, the 2-speaker state is automatically implemented, preventing interference between sound from the front audio source and sound from the rear audio source.

What is claimed is:

1. An entertainment system mounted on a vehicle, the system comprising:
    a plurality of audio sources; and
    a head unit provided in a front seat area of the vehicle,
    a rear controller provided in a rear seat area of the vehicle,
    wherein the head unit comprises:
       a control switch for switching between front control and rear control,
       at least one audio source control button shared between the front control and the rear control, the audio source control button enabling a user to select one of the plurality of audio sources and operate the selected audio source;
       a controller for causing a user operation on the audio source control button to be reflected in a front audio source played in the front seat area independently from a rear audio source when the front control is selected by the control switch and to be reflected in the rear audio source played in a rear seat area of the vehicle independently from the front audio source when the rear control is selected by the control switch; and
       an enabling switch for switching between an enabled state in which user operation on the rear controller is enabled and a disabled state in which user operation on the rear controller is disabled,
    wherein the rear controller comprises a rear audio source control button for enabling a user to select the rear audio source from the plurality of audio sources and operate the selected rear audio source if the rear controller is in the enabled state.

2. The entertainment system of claim 1,
    wherein the audio source control button includes at least one audio selection button for enabling a user to select one of the plurality of audio sources and at least one audio operating button for enabling a user to operate the selected audio source.

3. The entertainment system of claim 1, wherein the controller further selects the front control when the entertainment system is turned on.

4. The entertainment system of claim 1, wherein the head unit further comprises an indicator for indicating which of the front control or the rear control is selected.

5. The entertainment system of claim 1, wherein a rear control switch is provided between the head unit and the rear controller,
    wherein the rear control switch is turned on to connect between the head unit and the rear controller if the enabled state is selected by the enabling switch,
    wherein the rear control switch is turned off to disconnect between the head unit and the rear controller if the disabled state is selected by the enabling switch.

6. The entertainment system of claim 1, wherein the controller further disables a signal issued by the rear controller if the disabled state is selected by the enabling switch.

7. The entertainment system of claim 1, wherein the enabling switch is integrated with the control switch.

8. The entertainment system of claim 1, wherein the switching between the front control and the rear control is implemented by turning the control switch to the left or the right,
    wherein the switching between the enabled state and the disabled state is implemented by pressing the control switch.

9. The entertainment system of claim 1, wherein the head unit further comprises a rear power switch for turning on a rear controller.

10. The entertainment system of claim 1, wherein the rear controller is turned off if the entertainment is turned off by a main switch provided on the head unit.

11. The entertainment system of claim 1, wherein the head unit further comprises a twin display including a front display part and a rear display part,
    wherein the front display part shows an operating state of the front audio source and the rear display part shows an operating state of the rear audio source, wherein an indication showing the disabled state is displayed in the rear display part if the disabled state is selected by the enabling switch.

12. An entertainment system mounted on a vehicle, the system comprising:
    a plurality of audio sources;
    a head unit provided in a front seat area of the vehicle; and
    returning means for switching from the rear control to the front control if the head unit is not operated for a predetermined period after the rear control is selected by the control switch,
    wherein the head unit comprises a control switch for switching between front control and rear control,
    wherein, in the front control, the head unit selects a front audio source to be played in the front seat area from the plurality of audio sources and controls the selected front audio source,
    wherein, in the rear control, the head unit selects a rear audio source to be played in a rear seat area of the vehicle from the plurality of audio sources and controls the selected rear audio source.

13. An entertainment system mounted on a vehicle, the system comprising:
    a plurality of audio sources; and
    a head unit provided in a front seat area of the vehicle,
    wherein the head unit comprises a control switch for switching between front control and rear control, wherein, in the front control, the head unit selects a front audio source to be played in the front seat area from the plurality of audio sources and controls the selected front audio source, wherein, in the rear control, the head unit selects a rear audio source to be played in a rear seat area of the vehicle from the plurality of audio sources and controls the selected rear audio source, wherein the front control is selected by turning the control switch to one of the left and the right by more than a predetermined angle from a neutral position, wherein the rear control is selected by turning the control switch to the other of the left and the right by more than a predetermined angle from the neutral position, wherein the control switch is structured to return to the neutral position if a user's hand is moved off the control switch after the control switch is turned to the left or the right.

14. An entertainment system mounted on a vehicle, the system comprising:
   a plurality of audio sources; and
   a head unit provided in a front seat area of the vehicle,
   wherein the head unit comprises a control switch for switching between front control and rear control,
   wherein, in the front control, the head unit selects a front audio source to be played in the front seat area from the plurality of audio sources and controls the selected front audio source,
   wherein, in the rear control, the head unit selects a rear audio source to be played in a rear seat area of the vehicle from the plurality of audio sources and controls the selected rear audio source,
   wherein the head unit further comprises a twin display including a front display part and a rear display part,
   wherein the front display part shows an operating state of the front audio source and the rear display part shows an operating state of the rear audio source.

15. An entertainment system mounted on a vehicle, the entertainment system comprising:
   a plurality of audio sources;
   at least one front speaker provided in a front seat area of the vehicle;
   at least one rear speaker provided in a rear seat area of the vehicle;
   a headphone provided in the rear seat area;
   a head unit provided in the front seat area, the head unit comprising a first audio source control button for selecting a front audio source connected to the rear speaker and the front speaker from the plurality of audio sources;
   a rear controller provided in the rear seat area, the rear controller comprising a second audio source control button for selecting a rear audio source connected to the headphone from the plurality of audio sources,
   wherein the head unit further comprises:
      a front audio source switch for switching the front audio source in accordance with operation on the first audio source control button;
      a rear audio source switch for switching the rear audio source in accordance with operation on the second audio source control button; and
      a controller for comparing the front audio source and rear audio source each time the front audio source or the rear audio source is switched, the controller connecting the rear speaker to the front audio source so that sound comes out of the rear speaker and front speaker if the rear controller is on and the selected rear audio source is the same as the selected front audio source, and the controller disconnecting the rear speaker from the front audio source so that sound does not come out of the rear speaker if the rear controller is on and the selected rear audio source is different from the selected front audio source.

16. The entertainment system of claim 15, further comprising:
   a speaker switch provided between the rear speaker and the front audio source;
   wherein the controller switches the speaker switch between on and off to switch between connection and disconnection of the rear speaker to and from the front audio source.

17. The entertainment system of claim 15, wherein the rear speaker is connected to the selected front audio source when the rear controller is off.

18. The entertainment system of claim 15, wherein sound from the rear audio source comes out of the headphone if the rear controller is turned on.

19. The entertainment system of claim 15, wherein the head unit further comprises a rear display part for showing an operating state of the rear audio source,
   wherein the rear display part shows an indication showing the disconnection of the rear speaker if the rear speaker is disconnected from the front audio source.

20. The entertainment system of claim 15, the front audio source or the rear audio source is switched if a medium for one of the plurality of audio sources is inserted into a player corresponding to the audio source, or if the medium is ejected from the player.

21. The entertainment system of claim 15, further comprising a manual speaker switch for manually switching between connection and disconnection between the front audio source and the rear speaker.

22. The entertainment system of claim 21, wherein the head unit further comprises a rear power switch for turning on the rear controller,
   wherein the manual speaker switch is integrated with the rear power switch.

* * * * *